Nov. 5, 1968 R. L. GOLDEN 3,408,899
FLUIDIC OPERATED ROLLING DIAPHRAGM ACTUATOR OR THE LIKE
Filed June 20, 1966 2 Sheets-Sheet 1

INVENTOR
ROBERT L. GOLDEN

BY
Cauden & Cauden
HIS ATTORNEYS

Nov. 5, 1968 R. L. GOLDEN 3,408,899
FLUIDIC OPERATED ROLLING DIAPHRAGM ACTUATOR OR THE LIKE
Filed June 20, 1966 2 Sheets-Sheet 2

INVENTOR
ROBERT L. GOLDEN

BY
Cauden & Cauden
HIS ATTORNEYS

United States Patent Office 3,408,899
Patented Nov. 5, 1968

3,408,899
FLUIDIC OPERATED ROLLING DIAPHRAGM ACTUATOR OR THE LIKE
Robert L. Golden, Greensburg, Pa., assignor to Robertshaw Controls Company, Richmond, Va., a corporation of Delaware
Filed June 20, 1966, Ser. No. 558,884
10 Claims. (Cl. 91—357)

ABSTRACT OF THE DISCLOSURE

This disclosure relates to a multi-position vacuum operated actuator having a flexible, rolling diaphragm cooperating with a cup-shaped housing member to define a chamber therebetween, the diaphragm being backed up by a cup-shaped plate means having the open end facing toward an interior end wall means of the housing with that end wall means having a cup-shaped portion having the closed end thereof projecting into the chamber and facing toward the diaphragm, the actuator having a plurality of openings in the side wall means thereof and in the end wall means thereof so that the flexible diaphragm will roll against the side wall means to open and close the openings in the side wall means as the diaphragm rolls relatively thereto under the control of a fluidic signal being directed to the chamber of the actuator.

---

This invention relates to an improved fluidic operated rolling diaphragm actuator having a plurality of actuated positions thereof.

It is well known that various fluidic operated actuators have been provided in the past providing stepped control means for a mechanism to be actuated thereby. For example, the transmission means for controlling the spin speed and/or agitation speed as an automatic clothes washing machine or the like is infinitely variable between various limits thereof and such multi-position fluidic operated actuators have been utilized to selectively set such transmission means in various operating positions thereof as selected by the housewife or the like for a particular load of clothes.

Accordingly, it is a feature of this invention to provide an improved fluidic operated actuator of the above type wherein the same has a plurality of actuated positions thereof while the overall cost of the same is kept relatively low.

Thus, it is an object of this invention to provide an improved fluidic operated actuator having one or more of the novel features set forth above or hereinafter shown or described.

Other objects, uses and advantages of this invention are apparent from a reading of this description which proceeds with reference to the accompanying drawings forming a part thereof and wherein.

Figure 1:
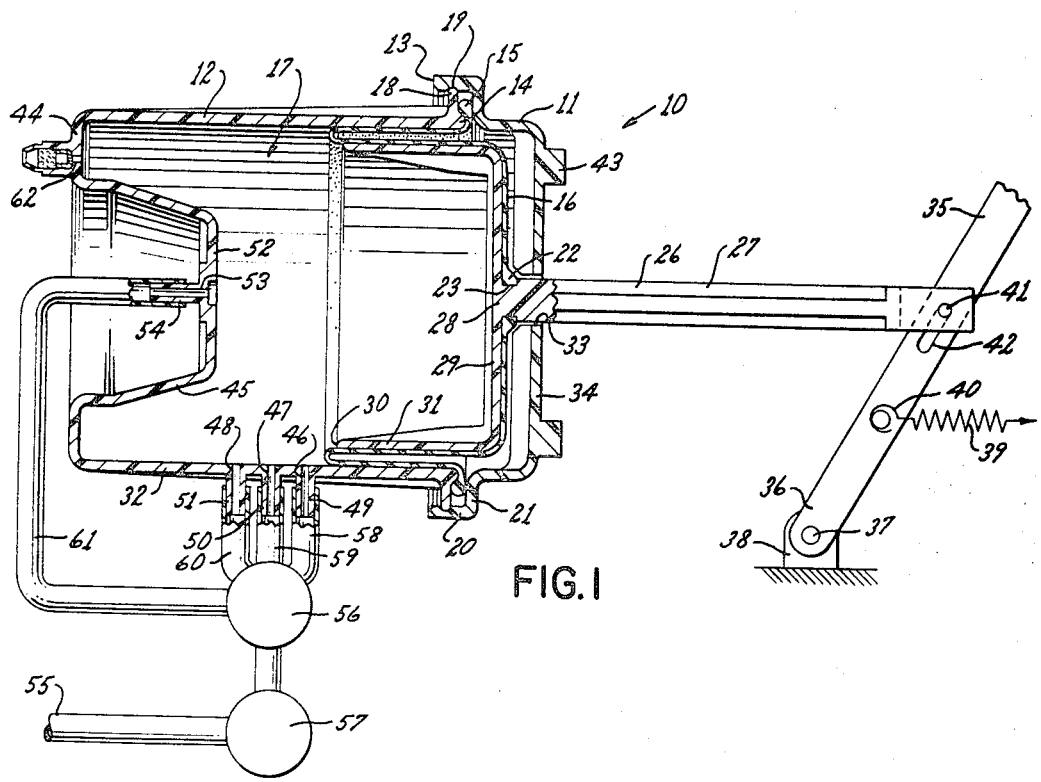
FIGURE 1 is a schematic cross-sectional view illustrating the improved fluidic operated actuator of this invention.

While the various features of this invention are hereinafter described and illustrated as being particularly adaptable to provide an actuator for providing stepped control means for an actuating member, it is to be understood that the various features of this invention can be utilized singly or in any combination thereof to provide actuating means for other devices as desired.

Therefore, this invention is not to be limited to only the embodiment illustrated in the drawings, because the drawings are merely utilized to illustrate one of the wide variety of uses of this invention.

Referring now to FIGURE 1, the improved fluidic operated actuator means of this invention is generally indicated by the reference numeral 10 and comprises a pair of cup-shaped housing members 11 and 12 snap-fitted together at the open ends 13 and 14 thereof to not only hold the housing members 11 and 12 together, but also to sealingly compress the outer periphery 15 of a flexible rolling diaphragm 16 therebetween, the diaphragm 16 cooperating with the housing member 12 to define a chamber 17 therebetween.

In particular, the cup-shaped housing member 12 has an outwardly directed annular rib 18 adjacent its open end 14 and is snap-fittingly received in an internal annular recess means 19 formed in a stepped flange means 20 at the open end 13 of the housing member 11. The outer periphery 15 of the flexible diaphragm 16 is formed by an annular thickened bead which is not only compressed between the rib 18 of the housing member 12 and the stepped shoulder 21 of the housing 11, but also is trapped between the extending open end 14 of the housing 12 and the shoulder means 21 of the housing 11 to prevent the same from being pulled radially inwardly.

The thickened inner periphery 22 of the flexible diaphragm 16 is substantially snap-fitted in sealing relation within an annular recess 23 of an actuator post means 26, the recess 23 being formed adjacent the juncture of a post portion 27 of the post means 26 and a diaphragm back-up plate means or portion 28 of the post means 26. The back-up plate portion 28 of the post means 26 is substantially cup-shaped to define a flat closed end 29 adjacent the diaphragm 16 and an outer open end 30 on a substantially cylindrical portion 31 thereof that is disposed coaxially and concentrically with the internal peripheral and cylindrical side wall portion 32 of the cup-shaped housing 12 while being radially inwardly spaced from the cylindrical surface or side wall 32 of the housing member 12.

In this manner, the cooperation between the cylindrical portion 31 of the back-up member 28 and the side wall 32 of the housing member 12 controls rolling movement of the diaphragm 16 between the positions illustrated in FIGURES 1–4 so that stretching and adverse forces are not placed on the diaphragm 16.

The post portion 27 of the post means 26 is adapted to project outwardly through a central aperture 33 in the closed end 34 of the housing member 11 and is adapted to be interconnected to an actuating member 35.

In particular, the actuating member 35 can comprise a lever having an end 36 pivotally mounted by a pivot pin 37 to a stationary bracket means 38 while the other end (not shown) is operatively interconnected to the speed control means of the variable transmission of a motor means for controlling the spin speed and/or agitation speed of a domestic automatic clothes washing machine or the like, the lever 35 normally being maintained in the position illustrated in FIGURE 1 by a tension spring 39 having one end 40 interconnected to the lever 35. The post portion 27 of the actuator 10 is pivotally interconnected to the lever 35 by a pivot pin 41 being carried by the post portion 27 and being received in an elongated slot 42 in the lever 35. With the actuator 10 disposed in the deactuated position of FIGURE 1, the force of the tension spring 39 positions the lever 35 in the position illustrated in FIGURE 1 by pulling the diaphragm 16 and post means 26 to the right until the same engages inwardly directed stop flanges 43 projecting radially inwardly from the closed end 34 of the housing member 11, the flanges 43 also preventing a dash-pot effect between the diaphragm 16 and the housing member 11 so that no retarding vacuum force can be created between the diaphragm 16 and housing member 11 during the movement of the actuator 10 between its various operating positions.

The housing member 12 has a closed end 44 provided with an inwardly formed cup-shaped portion 45 adapted to be telescoped by the cup-shaped back-up member 28 in the manner illustrated in FIGURES 3 and 4 for a purpose hereinafter described.

The side wall 32 of the housing member 12 is provided with a plurality of passage means 46, 47 and 48 passing therethrough and interconnecting the chamber 17 with the exterior of the actuator 10 through integral conduit nipples 49, 50 and 51. In addition, the closed end 52 of the cup-shaped portion 45 of the housing 12 has a passage means 53 passing therethrough to interconnect the chamber 17 with the exterior of the actuator 10 through a conduit nipple means 54.

The passage means 46, 47, 48 and 53 are adapted to be selectively interconnected to a fluidic source, such as the inlet 55 of a vacuum pump (not shown) by a selector valve means 56. However, in the system illustrated in FIGURE 1, the selector valve 56 is not adapted to interconnect the vacuum source inlet 55 with the chamber 17 of the actuator 10 until a suitable program controlling means 57 determines that the actuator 10 is to be actuated at a particular time during the cycle of operation, the selector valve 56 being respectively interconnected to the passages 46, 47, 48 and 53 by flexible conduit means 58, 59, 60 and 61.

The selector valve means 56 can be so constructed and arranged in combination with the program controlling means 57 that after each actuation of the actuator 10, the atmosphere is adapted to be interconnected to the chamber 17 of the actuator 10 through the conduit 61 so that the same will automatically return to the position of FIGURE 1 under the force of the tension spring 39. Alternately, an orifice means 62 can be formed in the closed end 44 of the housing member 12 to interconnect the atmosphere with the chamber 17 at all times. However, the orifice means 62 is so constructed and arranged that the same permits the air to return to the chamber 17 at a controlled rate so that the same will not prevent the vacuum source, when interconnected to the chamber 17, to draw the diaphragm 16 to the left in a manner hereinafter described to position the lever 35 in the selected position thereof.

The operation of the actuator means 10 utilized in the system illustrated in FIGURE 1 will now be described.

Should the housewife or the like when selecting a program or cycle of operation of the washing machine or the like desire a spin and/or agitation speed that requires the lever 35 to be disposed in the position illustrated in FIGURE 1, the housewife sets the selector means 56 in the desired position thereof whereby the vacuum source inlet 55 is never interconnected to the chamber 17 of the actuator 10 during the cycle of operation whereby the tension spring 39 maintains the actuating member 35 in the position of FIGURE 1 during the entire cycle of operation.

Figure 2:
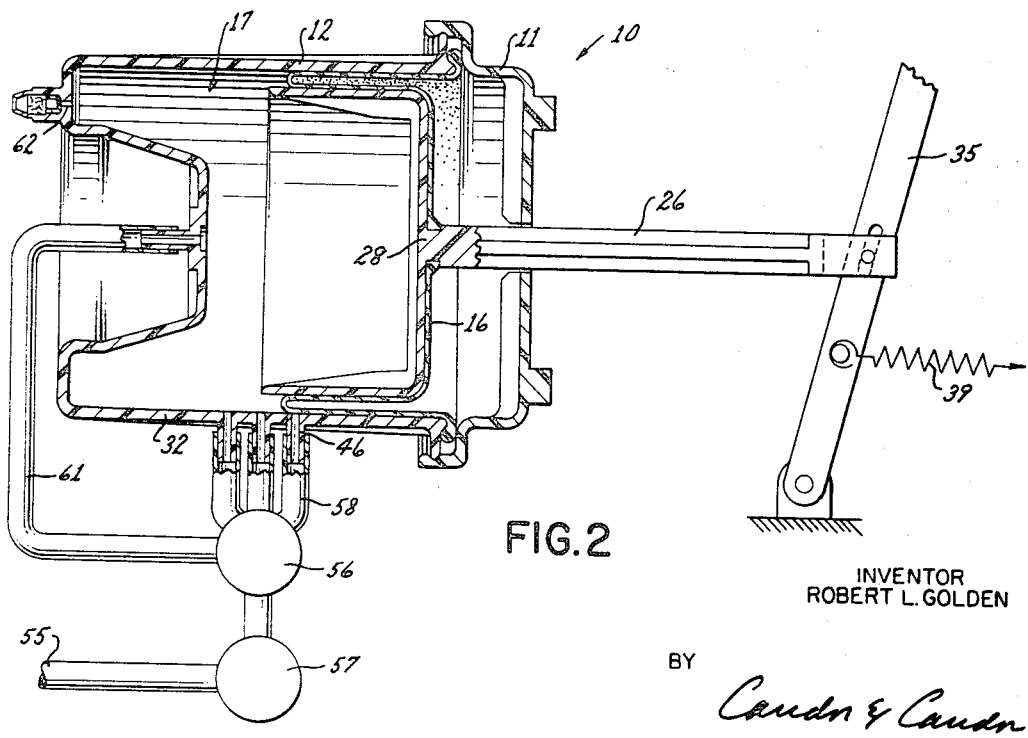
FIGURE 2 is a view similar to FIGURE 1 and illustrates the actuator in another position thereof.

However, should the housewife select a spin speed and/or agitation speed that would require the lever 35 to be disposed in the position of FIGURE 2, the selector valve 56 is adjusted by the housewife in such a manner that the same will interconnect the vacuum source inlet 55 to the conduit 58 leading to the passage means 46 when the program controlling means 57 determines that the lever 35 is to be actuated.

In particular, when the inlet 55 of the vacuum source is interconnected to the passage means 46, air is drawn out of the chamber 17 through the passage means 46 whereby the pressure differential acting on the diaphragm 16 moves the diaphragm 16 from the position illustrated in FIGURE 1 to the position illustrated in FIGURE 2. In this manner the diaphragm 16 progressively rolls from right to left down the internal peripheral surface of the side wall means 32 of the housing member 12.

When the diaphragm 16 has rolled from right to left to the position illustrated in FIGURE 2, it can be seen that the diaphragm 16 now covers the passage means 46 whereby the pressure differential causes the diaphragm 16 to seal closed the passage means 46 so that further evacuation of the chamber 17 is prevented. Thus, the movement of the diaphragm 16 to the left is terminated at the position illustrated in FIGURE 2 as the vacuum source inlet 55 is only being interconnected to the conduit 58 by the selector means 56. Accordingly, the lever 35 is positioned in its new speed setting position of FIGURE 2 and will remain in that position until the atmosphere is permitted to return to the chamber 17 by means of the valve means 56 and/or program means 57 interconnecting the atmosphere to the conduit 61. Alternately, if the orifice means 62 is being utilized, the orifice means 62 continuously tends to supply air into the chamber 17 whereby the tension spring 39 tends to move the diaphragm 16 back to the position illustrated in FIGURE 1. However, as the diaphragm begins to unroll from the position illustrated in FIGURE 2 toward the position illustrated in FIGURE 1, it can be seen that the passage means 46 will be again opened whereby as long as the vacuum source inlet 55 is interconnected to the conduit 58, a point of equilibrium is reached whereby the actuator 10 will remain substantially in the position illustrated in FIGURE 2.

Thus, it can be seen that the housewife or the like by means of the selector means 56 can manually select the position the actuator 10 will step the lever 35 to.

Figure 3:
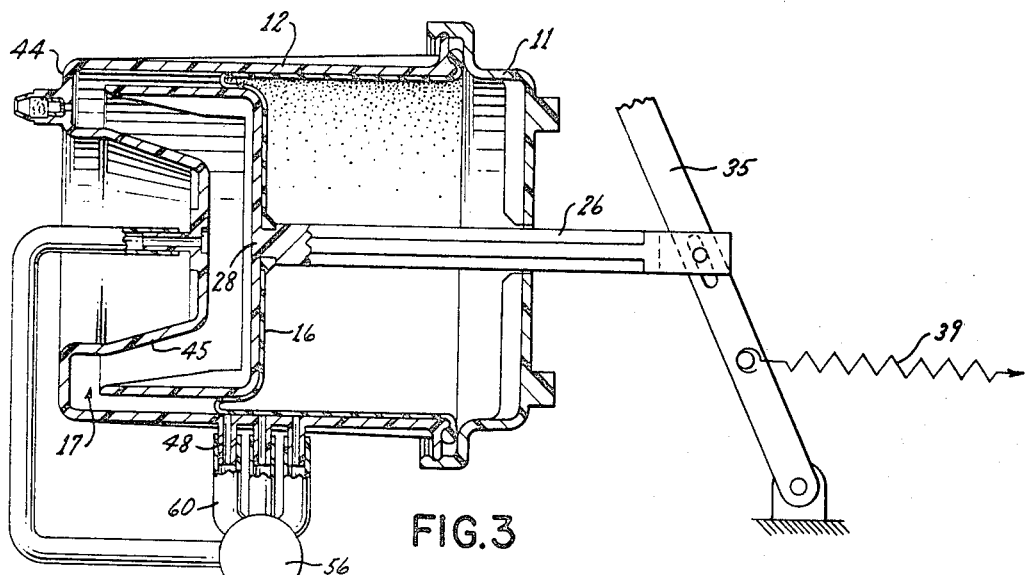
FIGURE 3 is a view similar to FIGURE 1 and illustrates the actuator in another operating position thereof.
Figure 3:
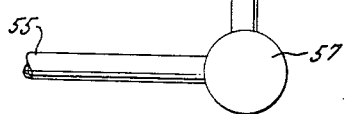

For example, when the selector valve means 56 is positioned to interconnect the vacuum source inlet 55 with the conduit means 60, the diaphragm 16 will roll from right to left to the position illustrated in FIGURE 3 to maintain the lever 35 in the position illustrated in FIGURE 3 in the manner previously described.

Figure 4:
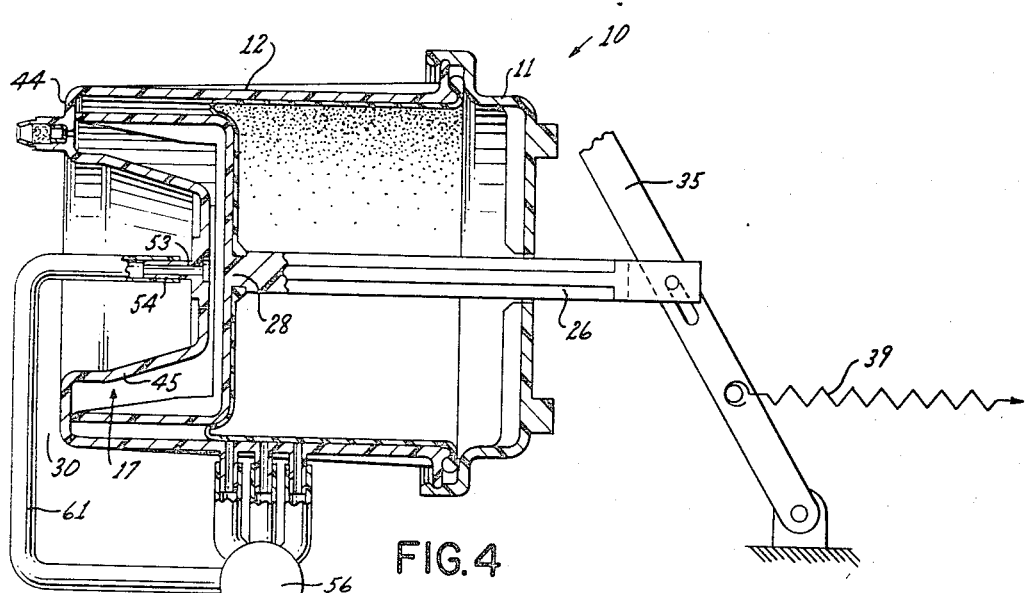
FIGURE 4 is a view similar to FIGURE 1 and illustrates the actuator in still another operating position thereof.
Figure 4:
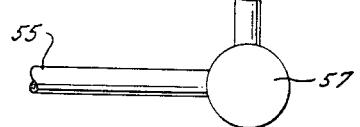

Should the selector valve means 56 be disposed in the position to interconnect the vacuum source inlet 55 with the conduit 61, the diaphragm 16 is rolled to the position illustrated in FIGURE 4 whereby the open end 30 of the back-up plate 28 will abut against the closed end 44 of the housing member 12 to terminate leftward movement of the actuator 10 to position the speed control lever 35 in the position illustrated in FIGURE 4, the back-up plate 28 when disposed against the end 44 of the housing means 12 still being spaced from the passage means 53 to prevent closing of the same so that the inlet 55 of the vacuum source is always interconnected to the chamber 17 in the manner illustrated in FIGURE 4 when the selector means 56 is interconnecting the inlet 55 to the conduit 61. This feature eliminates a requirement to provide positive sealing means for closing off the passage 53 when the actuator has moved to the position illustrated in FIGURE 4.

Therefore, it can be seen that this invention provides a fluidic operated actuator having stepped positions wherein the rolling diaphragm is uniquely utilized to not only control the actuation of an actuating member, but also to provide means for controlling the stepping thereof.

While the form of the invention now preferred has been disclosed as required by statute, other forms may be used, all coming within the scope of the claimed subject matter which follows.

What is claimed is:

1. A fluidic operated multi-position actuator comprising a housing means having a chamber therein defined by side wall means of said housing means, and a rolling diaphragm interconnected to said housing means to define said chamber therewith, said diaphragm being adapted to roll along said side wall means during fluidic operation of said actuator, said side wall means having a plurality of openings passing therethrough in stepped relation whereby said rolling diaphragm is adapted to open and close said openings as said diaphragm rolls relative thereto under the control of a fluidic signal being directed to said chamber said housing means having an end wall means provided with an opening therein for directing a fluidic signal to said chamber, said diaphragm carrying a cup-shaped back-up plate means that has its opened end facing away from said diaphragm for abutting said end wall means to space said diaphragm from said opening in said end wall means, said end wall means having a cup-shaped portion having its closed end projecting into said chamber, said opening in said end wall means being formed in said closed end of said cup-shaped portion of said end wall means whereby said cup-shaped back-up plate means and said cup-shaped portion cooperate together to effectively reduce the volumetric capacity of said chamber when said plate means abuts said end wall means.

2. An actuator as set forth in claim 1 wherein said diaphragm is adapted to seal closed any one of said openings of said side wall means that would have a vacuum fluidic source interconnected thereto to position the rolling part of said diaphragm at said one opening.

3. An actuator as set forth in claim 1 wherein said openings of said side wall means are longitudinally aligned in said side wall means.

4. An actuator as set forth in claim 1 wherein said housing means includes a pair of cup-shaped housing members respectively having their opened ends secured together.

5. An actuator as set forth in claim 4 wherein said diaphragm has an outer periphery thereof secured between said interconnected opened ends of said housing members.

6. An actuator as set forth in claim 5 wherein said housing members have said opened ends snap-fitted together and said outer periphery of said diaphragm has an annular bead sealing compressed between said snap-fitted housing members to define said chamber with one of said housing members.

7. An actuator as set forth in claim 6 wherein said other housing member has an opening passing therethrough and said diaphragm carries a post means that projects through said opening in said other housing member.

8. An actuator as set forth in claim 1 wherein said side wall means of said housing means is substantially cylindrical and said cup-shaped plate means is substantially cylindrical and inwardly spaced from said side wall means.

9. An actuator as set forth in claim 1 wherein said said back-up plate means has an actuating post and diaphragm has an opening through which said post projects.

10. An actuator as set forth in claim 9 wherein said opening of said diaphragm defines its inner periphery and said post and back-up plate means has an annular recess defined therebetween and sealing receiving said inner periphery.

References Cited

UNITED STATES PATENTS

| | | | |
|---|---|---|---|
| 2,986,125 | 5/1961 | Young et al. | 91—357 |
| 3,072,108 | 1/1963 | Cripe | 91—357 |
| 3,125,001 | 3/1964 | Cripe | 91—357 |
| 3,334,545 | 8/1967 | Houser | 91—357 |

PAUL E. MASLOUSKY, *Primary Examiner.*